United States Patent [19]

Wenger et al.

[11] E Re. 30,830

[45] Reissued Dec. 22, 1981

[54] PORTABLE RISER

[75] Inventors: Jerry A. Wenger, Owatonna; Harvey M. Urch, West Concord; David R. Boeddeker, Owatonna, all of Minn.

[73] Assignee: Wenger Corporation, Owatonna, Minn.

[21] Appl. No.: 99,209

[22] Filed: Nov. 30, 1979

Related U.S. Patent Documents

Reissue of:

[64] Patent No.: 3,974,894
Issued: Aug. 17, 1976
Appl. No.: 605,770
Filed: Aug. 18, 1975

[51] Int. Cl.[3] ..... E04H 3/12

[52] U.S. Cl. ..... 182/113; 182/132; 182/152; 52/9

[58] Field of Search ..... 182/152, 132, 106, 113, 182/27, 131; 52/183, 6, 9; 108/100

[56] References Cited

U.S. PATENT DOCUMENTS

| | | | |
|---|---|---|---|
| 1,125,194 | 1/1915 | Sigmund | 108/100 |
| 1,284,078 | 11/1918 | Evans | 182/152 |
| 1,818,428 | 8/1931 | Paysen | 52/183 |
| 2,575,593 | 11/1951 | Peery | 108/100 |
| 2,598,983 | 6/1952 | Ellis | 52/183 |
| 2,859,488 | 11/1958 | Mackintosh | 52/183 |
| 3,229,430 | 1/1966 | Berg | 52/183 |
| 3,747,706 | 7/1973 | Paine | 182/152 |
| 3,747,708 | 7/1973 | Wenger | 52/183 |

FOREIGN PATENT DOCUMENTS

| | | | |
|---|---|---|---|
| 2256560 | 5/1973 | Fed. Rep. of Germany | 182/152 |

*Primary Examiner*—Reinaldo P. Machado
*Attorney, Agent, or Firm*—Wegner, Stellman, McCord, Wiles & Wood

[57] ABSTRACT

A portable riser having a plurality of steps which have a travel position in superimposed relation with structure for rolling the riser along the floor, hinge means interconnecting the steps whereby they may be folded out of superimposed relation, a pair of sliders pivotally associated with each step and which are hinged to sliders of an adjacent step by said hinge means whereby lifting of one step causes erection of the riser to an erected position, and latch means automatically operable to prevent movement of the steps beyond erected position and to lock the riser in erected position for use.

21 Claims, 15 Drawing Figures

22
21
62
30
41
20
61
40

22
62
54
41
42
61
54
43
20
21
55
32

41
42
56
43
20
21
22
55
23
32

20
23
32
45
43
56
62
21
50
45
22
32
50
31
52
58
55
53
54
60
30
42
41
48
44
57
49
61
59
43
51
40
47

41
101
91
82
86
99
84
95
93
88
100
85
96
94
87
102
92
83
80
42

111
110
115
116
32
20
10.
10.
118
118
80
119
44
41
48
43
55
9.
42
51
40
9.

110
116
20
45
24
47
46
119
118
55
49
44
43
40
42
51

115
119
117
43
118

111
110
115
150a
116
150
20a
20
21a
22a
14
21
14.
40
22
58
51
57

111
110
115
116
47
150
155
119
155
163
118
119
163
20
162
21
153
13
13.
152
162
161
157
41
161
160
161
118
43
156
154
42
51
153
158
160
40
151

162
163
161
154
43
164

PORTABLE RISER

Matter enclosed in heavy brackets [ ] appears in the original patent but forms no part of this reissue specification; matter printed in italics indicates the additions made by reissue.

BACKGROUND OF THE INVENTION

This invention relates to a portable riser usable by choral groups either singly or in combination with other risers as well as by other groups including bands and orchestras.

The prior art has structures for stands or risers which can be moved between a storage position and an erect position for use. A structure of this type is shown in Ellis U.S. Pat. No. 2,598,983. The stand of this patent has no specific structure for portability and does not have an arrangement whereby the steps may be moved into a superimposed relation for travel.

The Mackintosh U.S. Pat. No. 2,859,488 discloses a stand with steps movable between a storage position and an erected position and has casters for portability. However, it is necessary to physically turn the entire unit between a position wherein the casters engage the floor and a position whereby the stand may be erected.

The Berg U.S. Pat. No. 3,229,430 discloses a choir riser wherein a plurality of steps are in superimposed relation for storage and which may be opened out and then the stand erected for use. There is no disclosure of structure facilitating portability of the unit, such as casters movable along a floor. Additionally, the structure of this patent requires turning of the entire unit to an upside down position in order to move the riser components between a storage position and an erected position.

The assignee of this application has U.S. Pat. Nos. 3,747,706 and 3,747,708 relating to a portable riser. In the structures of these patents, it is necessary to turn the riser between a travel position and a position for erection. These patents also show an optionally usable fourth step and the first of these patents shows a guard rail hinged to the unit for positioning at a level above and to the rear of the uppermost step.

SUMMARY

A primary feature of the invention disclosed herein is to have a portable riser which may be moved between travel and erected positions by one person and without any turning of the entire structure, but with only folding and unfolding of steps into and out of superimposed relation and with lifting force applied to a single step to move the entire riser to an erect position and with automatically operable means to limit movement of the riser to an erected position and to latch the structure in erected position.

In accomplishing the foregoing, a plurality of steps are hinged together whereby the uppermost step is at the bottom of the superimposed steps when in travel position and the uppermost step has structure associated therewith including casters and a handle to facilitate movement of the riser when in travel position. With the uppermost step resting on the floor, the other steps may be folded out to a side-by-side relation with the uppermost step, followed by lifting of the uppermost step to bring a pair of sliders hinged to the underside of the uppermost step to an erect, supporting position and which by interconnecting hinge means similarly brings the sliders associated with the other steps to an erect position.

Additional features of the invention reside in the automatically operable latch structure for limiting movement of the riser to an erect position and holding the riser in said erect position, including a manually operable lock for firmly securing the latch in position and removing any play from the structure; an optionally usable fourth step and a guard which may be associated with either a three-step riser or a four-step riser, with each of the fourth step and the guard having a similar type of clamp structure for securing to vertical sections of the sliders of an adjacent step and with the guard having a pair of depending legs which engage the floor when used with a three-step riser or engage a strut on the fourth step of a four-step riser to provide vertical support for the guard.

The portable riser is constructed of parts that are bolted together whereby the unit may be shipped disassembled for economy in shipping costs and, additionally, a replacement part may be ordered by any damaged part and easily installed.

The portability of the unit and ease of erection is accomplished by casters associated with a slider of the uppermost step which is in floor-engaging position and which are moved out of floor-engaging position as the riser is erected. Additionally, a handle, in the form of a U-shaped member, is mounted to the opposite end of the uppermost step to facilitate lifting and guiding of the riser when in travel position and with this handle also functioning as an interlock member to engage beneath the frame of an uppermost step of an adjacent riser in order to lock plural risers together when in erected position. This U-shaped member is releasably fastened by clamp means to the underside of a step and, more particularly, to a peripheral frame member of a step and as many of these members may be mounted and used as is deemed necessary to provide for interlocking of adjacent risers.

DESCRIPTION OF THE PREFERRED EMBODIMENT

The portable riser is shown generally in FIGS. 1 to 4 and has an uppermost step 20, an intermediate step 21, and a lowermost step 22. Each of these steps is of a construction shown particularly in FIG. 14 wherein a peripheral frame 23 has a board 24 which may be covered with material, such as carpeting, and which is locked into the frame by clips (not shown) and which results in an upwardly open channel 25 beneath the board 24 and extending around the periphery of each step. This channel is for receiving the clips referred to above and for a purpose more fully described hereinafter.

Figures 1, 2, 3, 4:
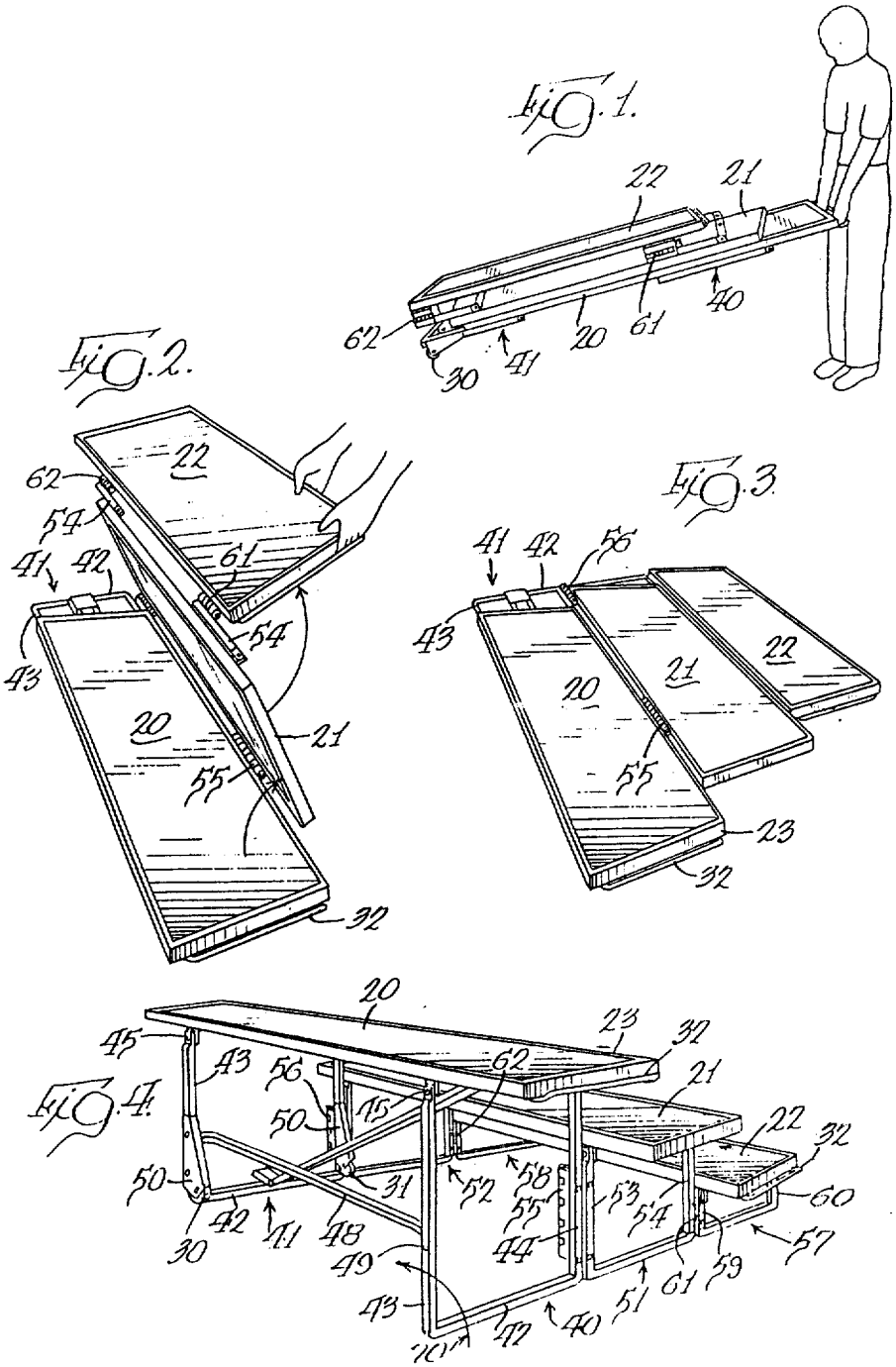
FIG. 1 is a perspective view of the portable riser in travel position and being transported.
FIG. 2 is a perspective view showing an initial operation in the erection of the riser.
FIG. 3 is a perspective view, similar to FIG. 2, showing the relation of the parts after completion of the operation illustrated in FIG. 2.
FIG. 4 is a perspective view, looking toward the rear of the riser in erected position.

In the travel position, the uppermost step 20 is positioned beneath and in facing relation with the intermediate step 21 and with the lowermost step 22 on top, as shown in FIG. 1 and as indicated by the partial erection operation shown in FIG. 2. The riser is easily moved by means of a pair of casters 30 and 31 which engage the floor when transporting the riser and with a handle 32 being disposed at an end of the uppermost step 20 for manual engagement as shown in FIG. 1.

Figure 5:
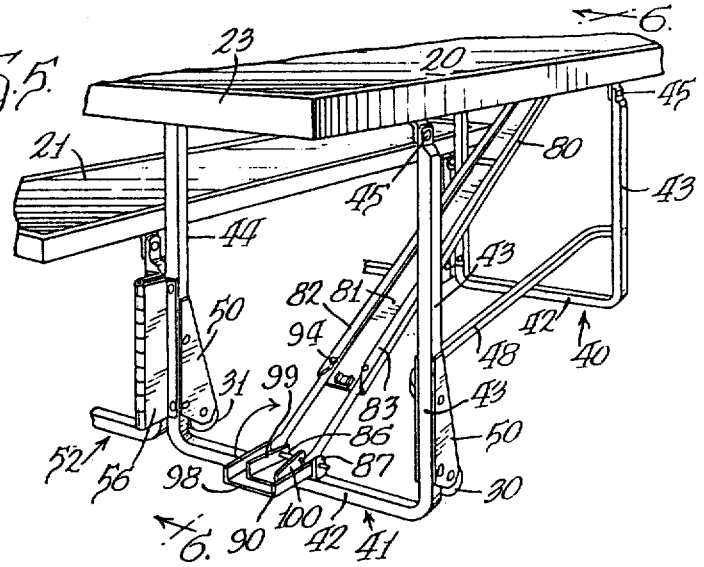
FIG. 5 is a fragmentary, perspective view, looking toward the rear of the portable riser in erected position and from the opposite direction of the view of FIG. 4.
Figure 6:
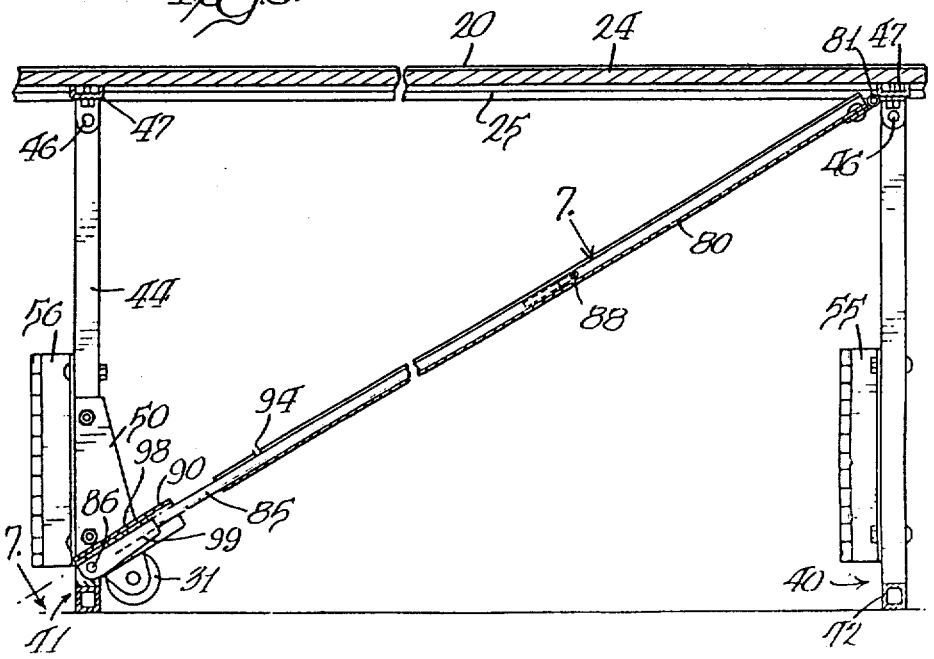
FIG. 6 is a fragmentary, vertical section, taken generally along the line 6—6 in FIG. 5.

With the portable riser shown in erected position in FIGS. 4 to 6, it will be noted that each of the steps 20–22 has a pair of floor-engaging sliders associated therewith. These sliders are all of a U-shape, with a central part for engagement with the floor and with a pair of legs which hinge to the underside of a step. More specifically, each of the sliders is formed of bent tubular stock and is provided with suitable openings to receive attaching bolts for association with structure to be described.

The uppermost step 20 has a pair of sliders, indicated generally at 40 and 41, with each slider being of the same construction and having a central part 42 and legs 43 and 44 which extend upwardly and are hinged to the underside of the step by a pair of bolts 45 and 46 (FIG. 9) connected to a bracket 47 secured to the underside of the step board 24.

Figures 7, 8, 9, 10:
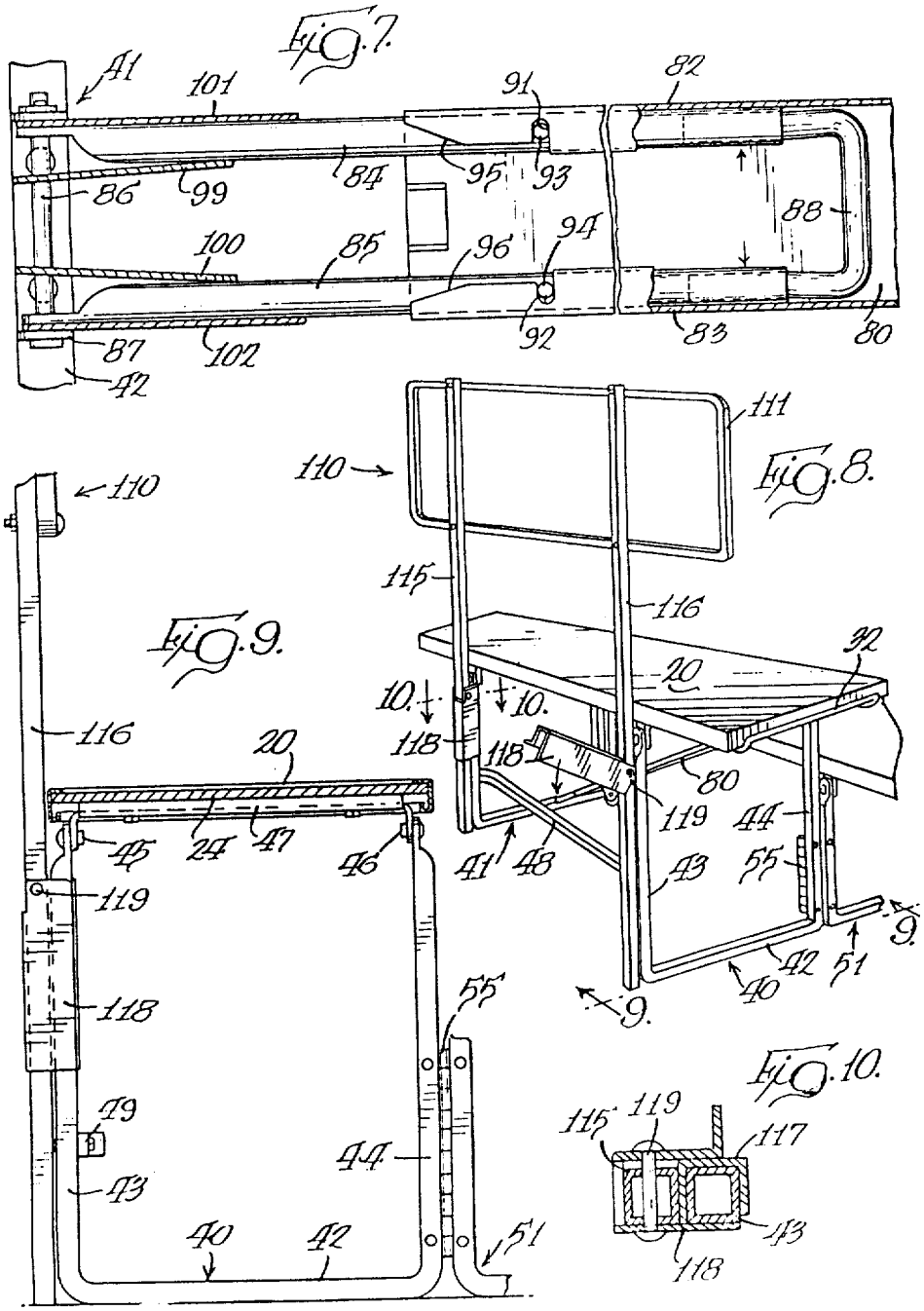
FIG. 7 is a sectional view, with parts broken away, taken generally along the line 7—7 in FIG. 6.
FIG. 8 is a fragmentary, perspective view, similar to the view of FIG. 4, and showing a guard attached thereto with two different clamp elements in different positions.
FIG. 9 is a fragmentary elevation, taken along the line 9—9 in FIG. 8 and with the step shown in section.
FIG. 10 is a sectional view, taken generally along the line 10—10 in FIG. 8.

The sliders 40 and 41 extend downwardly normal to the uppermost step 20 when in erected position, as shown in FIGS. 4, 8 and 9, while extending generally parallel to the uppermost step when in travel position, and as shown in FIG. 1. The sliders 40 and 41 are caused to move in unison relative to the step 20 by a strut 48 extending between the legs 43 of the pair of sliders and pivotally connected thereto at its opposite ends by bolt means 49. The casters 30 and 31 are each individually carried by a frame 50 bolted to the legs 43 and 44 of the slider 41 and positioned whereby they are located to engage the floor for travel, as shown in FIG. 1, but are out of engagement with the floor when the riser is in erected condition, as shown in FIG. 4.

The intermediate step 21 has a pair of sliders, indicated generally at 51 and 52, of the same construction as the sliders 40 and 41, but having a lesser height whereby the step 21 is at a level beneath the uppermost step 20 when the riser is erected and as shown in FIG. 4. Each of the sliders 51 and 52 has a pair of legs 53 and 54, with the legs 53 being connected to the legs 44 of the sliders 40 and 41 by first hinge means 55 and 56. These hinge means have hinge leaves of a width sufficient to span a riser step and the hinge leaves are secured to vertical sections of the slider legs whereby the riser steps 20 and 21 may be in superimposed facing relation when in travel position.

The lowermost step 22 has a pair of sliders, indicated generally at 57 and 58, which are of the same construction as the other sliders, but which have vertical legs 59 and 60 of an even shorter height than the legs 53 and 54 of the slider 51 to have the step 22 at a level lower than the intermediate step 21. The legs 59 of the sliders 57 and 58 are hinged to the legs 54 of the sliders 51 and 52 by second hinge means 61 and 62 which provide for positioning of the lowermost step 22 in superimposed back-to-back relation with the intermediate step 21 when in travel position.

Assuming the portable riser is to be placed into use, it is moved to a desired location by transport in the manner illustrated in FIG. 1 and then the handle end is lowered to the floor. One person may then move the steps out of superimposed relation to the position shown in FIG. 3, with an intermediate position being illustrated in FIG. 2. The person then moves to a location adjacent the slider 41 and may place a foot on the exposed central part 42 thereof to hold the central part in one position on the floor and then lifts and pulls the uppermost step 20 which erects the riser by movement in the direction indicated by the arrow 70 in FIG. 4. There is simultaneous movement of the slider 40 with the slider 41 through the connecting strut 48, with the sliders 51, 52, 57 and 58 of the steps 21 and 22 being caused to move simultaneously by the hinge means 55, 56, 61 and 62 interconnecting the sliders.

Automatically operable latch means, shown particularly in FIGS. 5, 6 and 7, function to limit the erecting movement of the riser to the position shown in FIGS. 4 and 5 and to latch the structure in this position. This structure includes a frame 80 pivotally mounted at its upper end by a pivot pin 81 to a bracket 47 secured to the underside of a step board 24. The frame 80 has a planar bottom panel 81 and sides which are shaped to form a pair of channels 82 and 83 for slidably receiving a pair of rods 84 and 85, each of which are pivotally mounted at their lower end to a pin 86 carried on a bracket 87 secured to a central part 42 of the slider 41. The nonpivoted ends of the rods 84 and 85 are interconnected by a spring member 88 which urges the rods apart from each other and toward the lateral walls of the channels 82 and 83 of the frame 80. A manually operable lock 90 coacts with the latch structure and is shown in an unlocked position in FIG. 5 and in locked position in FIGS. 6 and 7. When the lock 90 is in unlocked condition, the pivotally mounted ends of the rods 84 and 85 are permitted to move lengthwise along the pin 86, but are prevented from such movement when the lock 90 is in locked position.

The frame 80 has a pair of detent notches 91 and 92 which coact with detent pins 93 and 94, respectively, on the rods 84 and 85. With the riser in a travel position, the rods 84 and 85 are extended into the frame 80 a much lesser distance than shown in FIGS. 5, 6 and 7 and the detent pins 93 and 94 are outside the frame 80 and remote from the detent notches 91 and 92. As the uppermost step 20 is raised, the rods 84 and 85 move lengthwise of the frame 80 and initially the detent pins 93 and 94 contact cam surfaces 95 and 96 on recessed flanges of the frame channels whereby the rods are moved toward each other against the action of the spring interconnector 88 and then the rods move further lengthwise of the frame 80 until the detent pins 93 and 94 contact the walls of the detent notches 91 and 92 and which lie in the path of the detent pins. This limits the relative lengthwise movement of the latch mechanism and determines the erected position of the riser. The spring interconnector 88 forces the detent pins 93 and 94 outwardly into the detent notches 91 and 92 wherein the riser is automatically latched in erected position. This action has required the pivoted ends of the rods 84 and 85 to move toward and away from each other, as is permitted by their movement along the pin 86. In order to lock the latch mechanism, the manually operated lock 90 is moved from the position of FIG. 5 to the position shown in FIGS. 6 and 7. The lock 90 includes a cover plate 98 and a pair of wedge plates 99 and 100 on the underside thereof, all of which have the pin 86 loosely received therein for pivoting thereon and with the wedge plates 99 and 100 being at an angle to force the latch rods 84 and 85 to their outermost position relative to the pin 86 and against the depending walls 101 and 102 of the cover plate (FIG. 7) whereby all play is taken out of the latch structure and the latch is locked.

In order to return the portable riser from erected condition to travel position, an operator releases the manually-operated lock 90 and moves it to the position shown in FIG. 5. The rods 84 and 85 are moved toward each other to release the detent pins 93 and 94 from their respective detent notches and then the uppermost step 20 is gradually lowered to the position shown in FIG. 3 with resulting simultaneous lowering movement of the other steps. The steps are then folded from the position of FIG. 3 to the position of FIG. 1 and the portable riser may then be transported to another location or to storage, with the entire operation being accomplished by one person.

An optionally usable guard 110 is shown in association with the riser in FIGS. 8 to 10. This guard has a guard rail 111 located at a distance above the uppermost step and a pair of legs 115 and 116 depending downwardly from the guard rail into engagement with the floor. Each of these legs extends adjacent to a leg 43 of the sliders 40 and 41. Each of the guard legs carries attachment means including an elongate vertically extending three-sided bracket 117 which is secured thereto and has an open side to move laterally onto a leg 43 of a slider and as shown in FIG. 10. The attachment means of each guard leg also includes a U-shaped cross-section clip 118 which is pivoted to the guard rail leg by a pivot pin 119 and which is movable from the released position, shown for the clip associated with guard rail leg 116, to the locked position shown for the clip associated with the guard rail leg 115. The bracket 117 associated with the slider leg 43 locks the guard rail leg from rearward movement relative to the riser while the clip 118, when moved downwardly into locked relation, holds the parts in assembled relation and against relative lateral movement.

Figures 11, 12, 13:
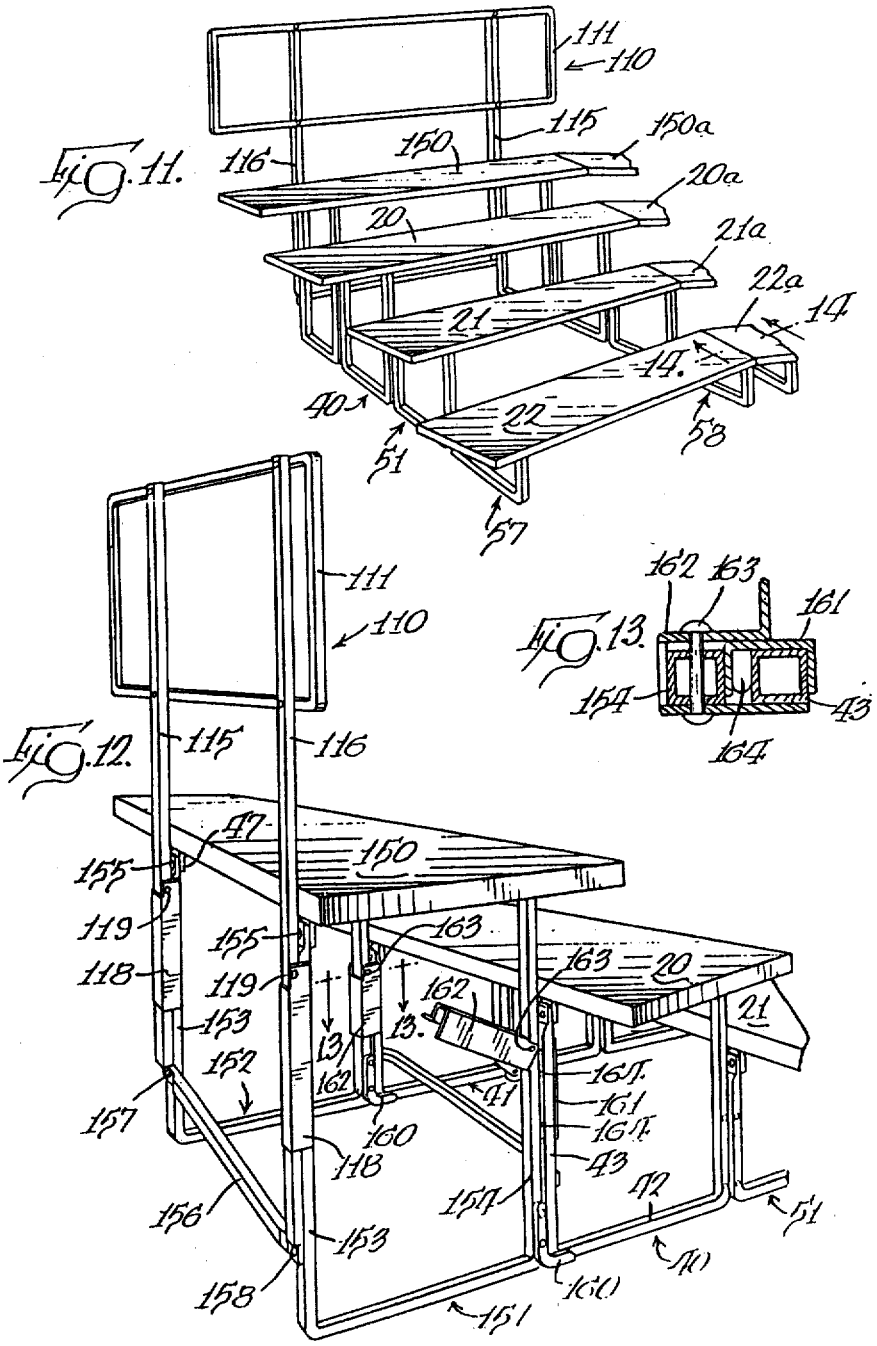
FIG. 11 is a perspective view, looking toward the front of the portable riser with an optional fourth step and the guard rail associated therewith and an adjacent riser also shown but broken away.
FIG. 12 is a fragmentary, perspective view, similar to FIG. 4, of the structure shown in FIG. 11.
FIG. 13 is a section, taken generally along the line 13—13 in FIG. 12.

FIGS. 11 and 12 show the portable riser with an optionally usable fourth step and with the guard 110. The fourth step 150 has a pair of sliders, indicated generally at 151 and 152, associated therewith which are of the same construction as the other sliders previously described, but with the legs 153 and 154 of each slider having a greater height to place the fourth step 150 at a higher level. Each of the sliders is pivotally connected to the underside of the step 150 by pivot bolts 155 secured to brackets 47 on the underside of the step board and the sliders are interconnected by a strut 156 which, at its opposite ends, is pivotally connected by bolts 157 and 158 to the slider legs 153. Each of the slider legs 154 carries a J-shaped bar secured to the lower end thereof and with a part 160 extending forwardly therefrom. Each of the slider legs also carries attachment structure, similar to that previously described for attaching the guard to the riser. This attachment structure includes an elongate three-sided bracket 161 secured to the leg and open on one side to laterally fit upon the slider leg 43 of the uppermost step 20 and a U-shaped cross-section clip 162 which can be pivotally moved from an out-of-the-way position to the locked position shown in FIG. 13 where it spans the slider leg 154, the slider leg 43 and the bracket 161. The clips 162 are pivoted to the slider legs 154 by pivot pins 163. For proper spacing of adjacent legs of sliders 40 and 151 and 41 and 152, there are spacer plates 164 secured within the elongate bracket 161 with the positioning thereof shown particularly in FIG. 13.

After the three-step riser is erected, the fourth step unit is moved to a position adjacent thereto and with the sliders 151 and 152 extending at a slight angle from the normal to the step 150. The bar legs 160 are placed in engagement with the central base parts of the sliders 40 and 41 and the sliders 151 and 152 are then moved fully erect and at the same time elongate brackets 161 are moved laterally onto the legs 43 of the sliders 40 and 41. Following this, the U-shaped clips 162 are moved downwardly about their pivot pins 163 to lock the fourth step to the three-step unit.

The guard 110 shown in FIGS. 11 and 12 is the same guard as shown and described in FIGS. 8 to 10. When mounted to the fourth step unit, the lower ends of the guard legs 115 and 116 do not rest upon the floor, but rest upon the upper sides of the strut 156 to hold the guard in the proper elevated position. The attachment structure, including the U-shaped clips 118 for the guard are assembled to the slider legs 153 of the fourth step in the same manner as they are assembled to the slider legs 43 of the uppermost step 20, as previously described.

Figure 14:
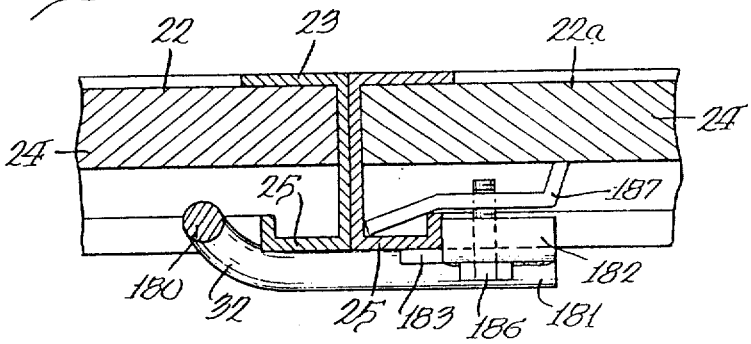
FIG. 14 is a sectional view, taken along the line 14—14 in FIG. 11.
Figure 15:
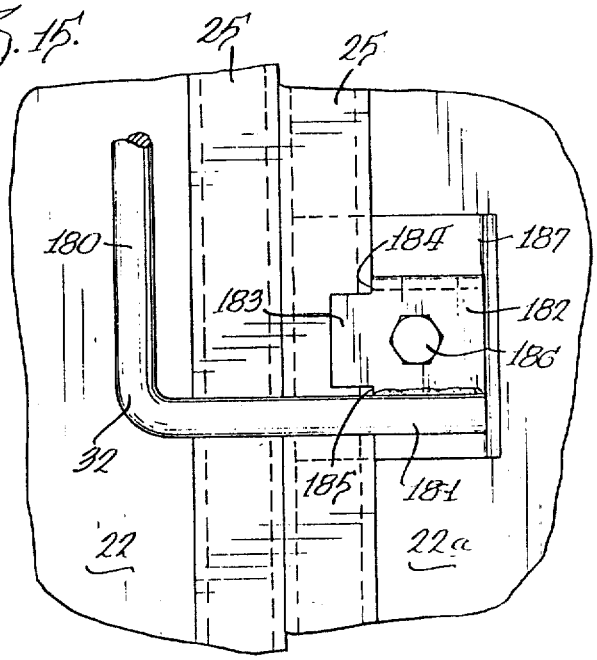
FIG. 15 is a bottom plan view of the structure shown in FIG. 14.

As shown in FIG. 11, a similar portable riser may be associated with that described herein and with the similar portable riser having comparable steps 20a, 21a, 22a and 150a. The adjacent steps may be interlocked where desired by use of a handle 32 which, as shown in FIG. 1, is used to facilitate manual handling of the riser when in travel position. The interlocking function of such a handle is shown in FIGS. 14 and 15. The handle is in the form of a U-shaped member with an intermediate part 180 and a pair of legs, one of which is shown at 181. The pair of legs extends beneath an end of a step and the intermediate part 180 lies in spaced parallel relation with the end of the step and beneath the level thereof to engage beneath the peripheral frame of a step of an adjacent riser. As shown in FIGS. 14 and 15, the handle 32 on step 22a has an intermediate part 180 beneath the step board 24 of the step 22 and under the open channel 25 of the peripheral frame thereof to lock the riser steps 22 and 22a. This interlocking is accomplished merely by tipping of one unit relative to the other to bring about the interfitting relation shown in FIG. 14. The handles which are also used for interlocking may be positioned wherever desired by means of releasable clamp structure which includes a bracket 182 welded to the leg 181 with a flange 183 underlying the channel 25 and a pair of surfaces 184 and 185 abutting against the edge of the channel. A bolt 186 passes through an opening in this bracket and is threadably received within a clip 187 which engages between the underside of the step board 24 and the interior of the channel 25 whereby tightening of the bolt draws the clip and bracket together in tight relation with force reactions against the step board and the channel. Similar releasable clamp structure is associated with the other leg of the U-shaped member 32. With this structure, it is possible to attach a handle functioning as an interlock for adjacent riser steps at the ends of one or more steps of a riser. It will be understood that only one handle 32 functions for transport of the riser as shown in FIG. 1.

We claim:

1. A portable riser having a plurality of steps of increasing elevation rearwardly of the riser, a pair of floor-engaging sliders hinged to the underside of each step for pivotal movement about parallel axes transverse to the length of a step whereby said steps may be moved from a travel position adjacent and parallel to said sliders to an erected position normal to said sliders, hinge means interconnecting sliders of adjacent steps for pivotal movement about axes lengthwise of the height of said sliders whereby said steps may fold relative to each other when said sliders are in said travel position, said hinge means including first hinges interconnecting the uppermost step and an intermediate step for movement between a superimposed facing relation when in a travel position and a side-by-side position and second hinge means connecting said intermediate step and lowermost step for movement between a superimposed back-to-back relation in a travel position and a side-by-side position, and automatically engageable latch means interconnecting a step and one of said associated pair of sliders to hold said riser in erected position.

2. A portable riser as defined in claim 1 wherein said latch means includes a manually operable lock to hold said latch means in engagement.

3. A portable riser as defined in claim 2 wherein said latch means includes a frame pivoted at an end to a step, a pair of rods pivoted at an end thereof to a slider and movable lengthwise of said frame, and interengaging detent means on said rods and frame for holding said rods and frame in a predetermined position lengthwise of each other.

4. A portable riser as defined in claim 3 wherein said frame has a pair of guide channels, spring means connected to said rods urging the rods apart and into said guide channels, and said detent means including a pin on each of said rods and a notch in a channel with the pin being urged into said notch by said spring means.

5. A portable riser as defined in claim 4 wherein said manually operable lock includes a pivotally mounted plate and cam members thereon movable between said pair of rods to force said rods apart and maintain said pins in said notches.

6. A portable riser as defined in claim 1 including casters on one slider of the uppermost step and a handle at the opposite end of the last-mentioned step whereby said riser may be moved on said casters when in a travel position, and said casters being positioned to move off the floor as the riser is erected and supported by said sliders.

7. A portable riser as defined in claim 6 wherein said handle extends outwardly from said end of the uppermost step, and an uppermost step having a peripheral frame open at the underside to fit over said handle and interlock two adjacent risers in end-to-end relation.

8. A portable riser as defined in claim 7 wherein said handle is generally U-shaped and with the legs thereof extending under a step, and releasable clamp means for attaching the handle to an end of any step.

9. A portable riser as defined in claim 1 including an optionally usable additional step positionable to the rear of said uppermost step, a pair of floor-engaging sliders pivotally connected to said additional step, means on the last-mentioned sliders for engaging and locking to the sliders of said uppermost step.

10. A portable riser as defined in claim 9 wherein said engaging and locking means includes an elongate bracket open along one side to receive an elongate portion of a slider, a bar to engage an adjacent slider base, and a swingable U-shaped clip movable to a position spanning adjacent elongate portions of two sliders for locking said sliders together.

11. A portable riser as defined in claim 9 including a guard positionable above said additional step and having a pair of depending legs, a strut pivotally connected between the sliders of said additional step and positioned to be engaged by the lower ends of said legs for vertical support thereof, and means for attaching said legs to the sliders of the additional step including an elongate bracket having an opening to receive a section of a slider, and a swingable U-shaped clip movable to a position spanning a leg and said slider section.

12. A portable riser as defined in claim 1 wherein additional structure is attached to the rear of said riser by connection to vertical sections of the sliders of the uppermost step and attachment means carried by said additional structure including an upright bracket having an open side to fit on one of said slider vertical sections to prevent movement of said additional structure rearwardly of said riser, and a U-shaped clip movable to a position spanning a part of said additional structure and said slider vertical section to prevent movement from side to side of the riser.

13. A portable riser as defined in claim 1 wherein a guard is attachable to said uppermost step and has a pair of floor-engaging legs, and attachment means carried by each leg including an elongate bracket with an open side to receive a vertical section of a slider and lock the guard against rearward movement, and a U-shaped clip pivotally mounted on a leg for movement to a position spanning said leg and slider vertical section to lock the leg against movement sideways of the riser.

14. A portable riser as defined in claim 1 wherein each of said sliders is formed of tubular stock and generally of a U-shape to have a base for floor engagement and a pair of legs, said hinging being to the upper ends of said legs, a strut pivotally connected to both of the sliders of the uppermost step for causing uniform movement of all the sliders between travel and erected positions, and said first and second hinge means being bolted to the legs of said sliders.

15. A portable riser as defined in claim 1 wherein each of said steps has a peripheral frame with an open channel on the underside, a U-shaped member with an intermediate part and a pair of legs, said pair of legs extending beneath an end of a step and said intermediate part lying in spaced parallel relation with said step end and beneath the level thereof to engage beneath the peripheral frame of an adjacent step end of another riser, and releasable clamp means engaging said legs and positioned within said open channel to lock said U-shaped member with a selected step.

16. A portable riser as defined in claim 1 and including a guard positionable at a level above the uppermost step, said guard including a pair of support legs, and locking means for attachment to a pair of sliders including a pair of elongate three-sided brackets attached one to each leg for lateral fitting onto a vertical section of each of said sliders to prevent rearward movement of said legs, and a pair of U-shaped clips pivotally mounted one on each leg movable to a position to span a leg, a slider vertical section and a bracket to lock said last-mentioned parts together.

17. A portable riser as defined in claim 1 wherein a strut pivotally interconnects the sliders of at least one step to assure simultaneous movement of said sliders in movement of the riser between travel and erected positions, and said latch means includes interengaging sliding parts with a spring loaded detent on one part movable into a notch in the other part when said riser has been moved to an erected position whereby the erected position is automatically obtained.

18. A portable riser having a plurality of steps of increasing elevation rearwardly of the riser, a pair of floor-engaging sliders for each step and each slider being of a U-shape with an intermediate part resting on the floor and a pair of upstanding legs pivotally connected at their upper ends to the underside of a step, a first pair of hinges interconnecting the sliders of an uppermost step and an intermediate step with hinge leaves of a width equal to the thickness of a step and positioned to permit the last-mentioned steps to be in superimposed facing relation when in a travel position, a second pair of hinges interconnecting said intermediate step and a lower step with hinge leaves of a lesser width than said first pair of hinges and positioned to permit the last-mentioned steps to be in a superimposed back-to-back relation in a travel position, caster means on one of the sliders of the uppermost step whereby the superimposed steps may be transported, and erection of the riser is obtained by unfolding said steps out of superimposed relation while the casters are on the floor followed by lifting of the steps relative to the sliders to place the sliders in support position beneath the steps, and automatically operable means interconnecting a step and an associated slider to limit lifting movement of the steps and hold the riser in erected position.

*19. A portable riser movable between erected and travel positions without turnover and having a plurality of steps of increasing elevation rearwardly of the riser, a pair of floor-engaging sliders hinged to the underside of each step for pivotal movement about parallel axes transverse to the length of a step whereby said steps may be moved from a travel position adjacent and parallel to said sliders to an erected position normal to said sliders, hinge means interconnecting sliders of adjacent steps for pivotal movement about axes lengthwise of the height of said sliders whereby said steps may fold relative to each other when said sliders are in said travel position, said uppermost step having its pair of sliders resting on the floor in both travel and erected positions, said hinge means including first hinges interconnecting the sliders of the uppermost step and of the intermediate step and having all the hinge leaves with an exposed width at least equal to the thickness of a step whereby the uppermost and intermediate steps are movable between a superimposed facing relation when in a travel position and a side-by-side position, the sliders of the last-mentioned steps having the thickness of two steps therebetween when in said travel position, second hinge means connecting said intermediate step and lowermost step for movement between a superimposed back-to-back relation in a travel position and a side-by-side position, and automatically engageable latch means interconnecting a step and one of said associated pair of sliders to hold said riser in erected position and moved to latch position as the riser is erected.*

*20. A portable riser as defined in claim 19 wherein said latch means includes a frame pivoted at an end to a step, a pair of rods pivoted at an end thereof to a slider and movable lengthwise of said frame, and interengaging detent means on said rods and frame for holding said rods and frame in a predetermined position lengthwise of each other.*

*21. A portable riser as defined in claim 20 wherein said frame has a pair of guide channels, spring means connected to said rods urging the rods apart and into said guide channels, and said detent means including a pin on each of said rods and a notch in a channel with the pin being urged into said notch by said spring means.*

* * * * *